G. L. ALLEN.
CUSHION WHEEL.
APPLICATION FILED OCT. 17, 1921.
1,427,995.
Patented Sept. 5, 1922.
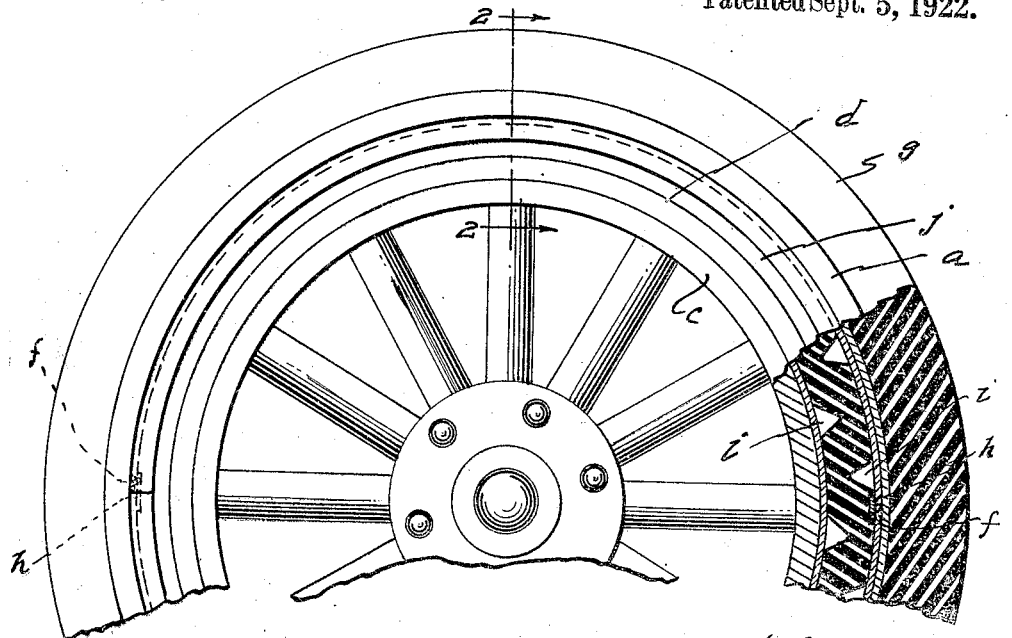
Fig. 1
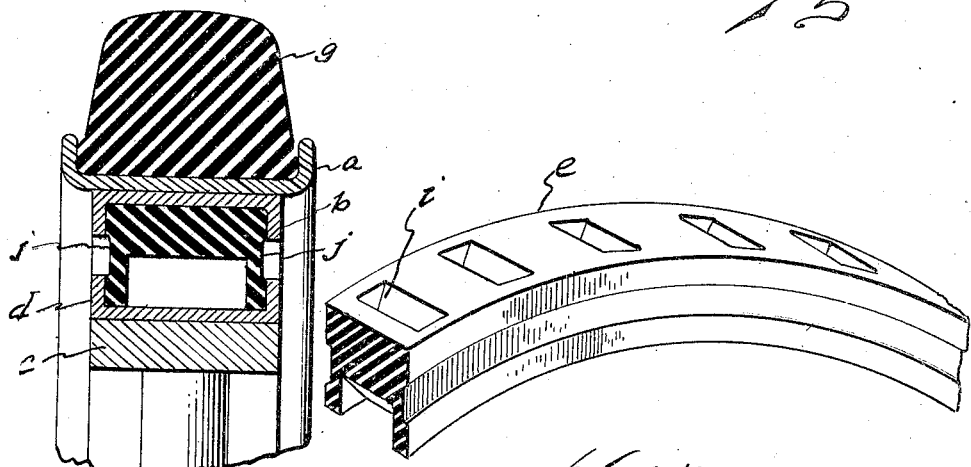
Fig. 2
Fig. 3
INVENTOR.
BY George L. Allen
Stuart C. Barnes
ATTORNEY.

Patented Sept. 5, 1922.

1,427,995

UNITED STATES PATENT OFFICE.

GEORGE L. ALLEN, OF DETROIT, MICHIGAN.

CUSHION WHEEL.

Application filed October 17, 1921. Serial No. 508,290.

*To all whom it may concern:*

Be it known that I, GEORGE L. ALLEN, a citizen of the United States, residing at Detroit, in the county of Wayne and State of Michigan, have invented certain new and useful Improvemnets in Cushion Wheels, of which the following is a specification.

This invention relates to cushion wheels, and has for its object an improvement in cushion wheels which enables a wheel of this character to be made relatively more cheaply. It is also a better large production proposition than similar types of this wheel.

It is not broadly new to employ a wheel with a rubber cushion separating the outer and inner wheel sections to permit one to become eccentric to the other under load. Wheels of this type are now in common use on trucks. These wheels ordinarily use a rubber cushioning element between the outer and inner wheel sections and they employ separate rubber or metal flanges to overlap the sides of the rim and the felloe as well as ensheathe the cushioning element. These rings are clamped to the sides of the felloe by bolts alone or by metal clamping rings and bolts run through the felloe and the rim. This is relatively an expensive construction.

It is the object of my present invention to afford a rubber cushioning element which incorporates the chief function of the rings (prevents mud, dirt and water getting into the recesses in the cushioning element) and at the same time affords a construction which wholly eliminates the clamping rings and bolts. The outer rubber tire and channel rim in effect takes the place of the clamping rings, as will be more fully described.

In the drawings,—

Fig. 1 is a fragmentary elevation of my cushion wheel with a part sectioned.

Fig. 2 is a section on the line 2—2 of Fig. 1.

Fig. 3 is a fragmentary perspective of the rubber cushioning element.

The wheel is made up of an outer and an inner wheel section separated by a molded rubber cushion. The inner wheel section comprises a felloe $c$ with an outwardly opening channel ring $d$ shrunk onto the felloe. The outer wheel section comprises a channel ring $b$ made up of a pair of half ring segments that are locked together by a clip $h$ spot-welded to one end of a half ring segment and secured to the opposing end of the other half ring segment by a screw $f$ with a countersunk head. This fastening clip or fastening device is very useful for it temporarily holds the channeled and segmental ring $b$ together and this, of course, holds the rubber cushion onto the inner wheel section. This temporary assembly is useful for two purposes. Ordinarily a cushion wheel of this type is sold without having the outer tire installed. The tire used on the outside of the wheel is ordinarily not seated upon the wheel by the wheel maker. The wheel maker sells the wheel simply with a metal ring on the outside of the rubber cushion which ring is arranged to seat the channeled rim which comes with the tire.

As already pointed out in the introductory matter, the cushion is ordinarily held in place by separate rings either of metal or rubber or both. These are bolted to the felloe and also to the ring that is assembled on the outside of the rubber cushion. The cushion is ordinarily assembled in between the felloe and the outer rim. The clamping rings are then bolted on to hold the cushion in place. With the construction that I have already described no clamping rings or bolts are used but by making the channel ring $b$ segmental and providing fastening devices such as clips and screws, the ring may be fitted over the cushion. The tire comes vulcanized directly to the channeled rim. The channeled rim can then be pressed with considerable pressure over the two-part channel ring $b$. This then unites the channel ring segments $b$ to the channelled rim $a$ and also to each other so that the whole becomes practically one integral unit. The outer wheel section, therefore, comprises the channelled segments $b$, the outer channeled rim $a$, and the tire $d$.

The cushion is made of moulded strips which are substantially rectangular in cross section but which are recessed with V-like recesses at top and bottom. These, however, are staggered, as is shown in Fig. 1. This forms a cushioning element which is sometimes called a "trussed" cushion and is about the most satisfactory rubber cushioning element for wheels that has been found. However, in place of using separate rubber flanges for keeping the dirt, mud and water out of the recesses, I mould the flanges directly into the cushioning block. In other words, instead of the recesses $i$ provided to allow the distortion of the rubber extending from edge to edge of the block and open on the sides, these recesses do not extend clear to the edges of the block but are confined entirely within the interior of the block. Consequently the rubber substance at the ends of the recesses form rubber flanges which co-operating with the flanges on the channels prevent any mud, water or dirt entering the recesses. At the same time this construction affords the whole width of the cushioning element to resist the lateral strains communicated from the channel flanges when there is any tendency or forces tending to displace one section with respect to the other.

The solid sides of the cushion are grooved as at $j$ so that the corners of the channel flanges will not chafe the rubber at this point when there is any movement.

What I claim is:

1. A cushion wheel, having in combination, an inner wheel section provided with an outwardly opening channel on its periphery and an outer wheel section provided with an inwardly opening channel on its inside, said outer section channel ring made up of a plurality of segments that engage each other end to end, a rubber cushion contained between the two sections in the opposed channels, and a rubber outer tire and rim pressed over the plural segment outer section channel ring to hold the parts together and form the traction surface.

2. A cushion wheel, having in combination, an inner wheel section provided with an outwardly opening channel on its periphery, an outer wheel section having a channel ring divided transversely into a plurality of segments which can be temporarily locked together by a clip and fastening devices, a rubber cushion contained in the opposed channels between the two wheel sections and locking the same together against lateral movement, and a rubber tire and rim that can be pressed onto the outer wheel section to hold all the parts together and form a traction surface.

3. A cushion wheel, having in combination, an inner wheel section provided with an outwardly facing channel ring, an outer section provided with an inwardly facing channel ring on its inside, a rubber block or cushion engaging in both of the said channels to hold the wheel sections against lateral movement with respect to each other, the said cushion having closed sides continuous from channel to channel but internal recesses that permit distortion of the rubber, which, however, are arranged to present alternate internal recesses and sections that are solid from side to side of the cushion.

4. A cushion wheel, having in combination, an inner wheel section provided with a channel ring with integral flanges on its periphery, an outer wheel section provided with a channel ring with integral flanges on its inside, the openings in the two channels being opposed, and a rubber cushion contained in the two channels and comprising a rubber strip extending around the wheel and having closed sides continuous from channel to channel but having staggered recesses in the outside and inside of the cushion, said recesses being closed by the channels, but arranged to present alternate internal recesses and sections that are solid from side to side of the cushion.

5. A cushion wheel, having in combination, an inner wheel section provided with a wooden felloe and a metal channel ring outwardly opening, an outer wheel section provided with a channel rim and an inwardly opening channel secured thereto having an opening opposing the opening in the felloe channel, the said inwardly opening channel attached thereto being divided into segments, a rubber cushion which can be fitted into the channels by reason of the segmental character of the outer said channel and which is provided with integral closed sides but internal recesses, and a rubber tire that can be fitted into the channel rim, the said rim of the outer wheel section holding the parts together.

6. A cushion wheel, having in combination, an inner wheel section provided with an outwardly opening channel on its periphery, an outer wheel section provided with an inwardly opening channel on its inside, and a rubber cushion confined between the two channels and having staggered recesses in the top and bottom which do not reach either side of the cushion and consequently leave the cushion with solid sides reaching from channel to channel.

In testimony whereof I affix my signature.

GEORGE L. ALLEN.